United States Patent [19]

Kasahara

[11] Patent Number: 5,737,302
[45] Date of Patent: Apr. 7, 1998

[54] GALVANOMIRROR AND OPTICAL DISK DRIVE USING THE SAME

[75] Inventor: Akihiro Kasahara, Chiba-ken, Japan

[73] Assignee: Kabushiki Kaisha Toshiba, Kawasaki, Japan

[21] Appl. No.: 554,933

[22] Filed: Nov. 9, 1995

[30] Foreign Application Priority Data

Nov. 10, 1994 [JP] Japan ................................ 6-276263

[51] Int. Cl.⁶ ................................................ G11B 7/00
[52] U.S. Cl. .................... 369/118; 359/221; 359/214; 359/230; 359/291
[58] Field of Search ............................ 359/221, 224, 359/226, 225, 230, 214, 846, 291, 315; 369/118, 44.21

[56] References Cited

U.S. PATENT DOCUMENTS

| | | | |
|---|---|---|---|
| 4,074,312 | 2/1978 | van Rosmalen | 359/214 |
| 4,421,381 | 12/1983 | Ueda et al. | 359/214 |
| 4,744,071 | 5/1988 | Bricot et al. | 369/118 |
| 5,096,279 | 3/1992 | Hornbeck et al. | 359/230 |
| 5,202,785 | 4/1993 | Nelson | 359/214 |
| 5,249,173 | 9/1993 | Tanaka | 359/221 |
| 5,526,172 | 6/1996 | Kanack | 359/291 |

FOREIGN PATENT DOCUMENTS

| | | |
|---|---|---|
| 2-23849 | 5/1990 | Japan . |
| 3-53702 | 8/1991 | Japan . |

*Primary Examiner*—Loha Ben
*Attorney, Agent, or Firm*—Cushman, Darby & Cushman IP Group of Pillsbury, Madison & Sutro LLP

[57] ABSTRACT

A galvanomirror includes a rocking member provided with a reflector. The rocking member is constituted of a semiconductor such as silicon, and connected to a hollow portion of a first plate through two elastic members. Second and third plates are insulatively bonded onto both sides of the first plate. Four electrodes are symmetrically provided on those portions of the second and third plates that correspond to the rocking member. In this constitution, if the rocking member is charged positively (negatively), the electrodes are charged negatively (positively), and the electrodes are charged positively (negatively), the rocking member is rotated (rocked) while the elastic members are twistedly deformed.

17 Claims, 10 Drawing Sheets

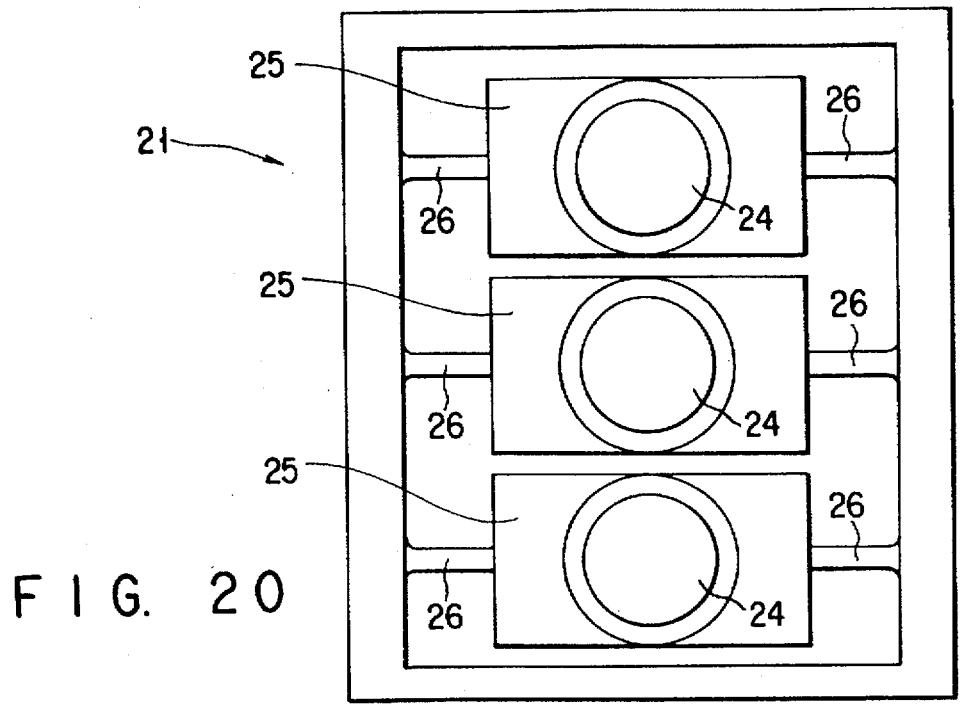
F I G. 20
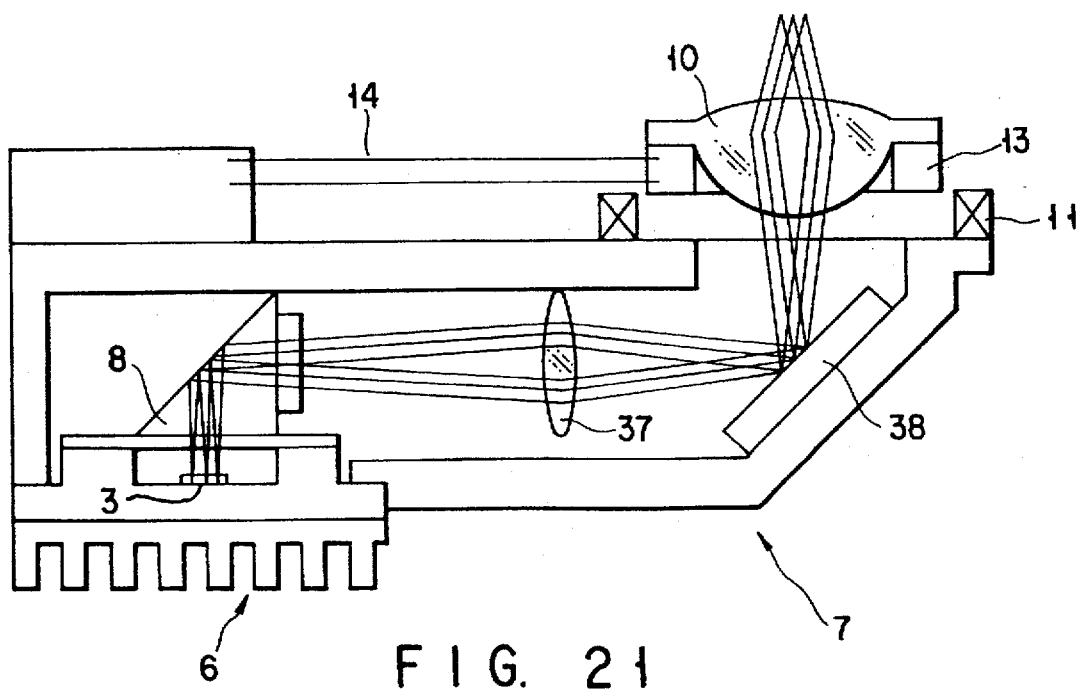
F I G. 21

GALVANOMIRROR AND OPTICAL DISK DRIVE USING THE SAME

BACKGROUND OF THE INVENTION

1. Field of the Invention

The present invention relates to a galvanomirror for reflecting a laser beam in a desired direction and an optical disk drive for recording/reproducing information on/from an optical disk by means of an optical head loaded with the galvanomirror.

2. Description of the Related Art

It is well-known that an optical disk drive for reproducing information using a laser beam, such as a compact disk (CD) and a laser disk (LD), has been widely popularized. Recently an optical disk drive has been utilized as a memory device of a computer and concurrently a high-speed operation of an optical head loaded with an optical system has been required so as to enable data to be recorded/reproduced at high speed.

To meet the requirement, there is proposed a system for achieving a quick seek by making the optical head as light as possible. One example of the system is a separated optical system wherein an optical head is not loaded with a semiconductor laser (light source), a photodetector, or the like but an object lens for focusing a laser beam on an optical disk.

One example of the separated optical system will now be described with reference to FIG. 1.

A fixed optical system 113 including a semiconductor laser 111 and a photodetector 112 is fixed onto a base (not shown) or the like. A laser beam L is emitted from the semiconductor laser 111 and sent to an object lens 116 loaded onto an optical head 115 through a fixed galvanomirror 114. The object lens 116 focuses the laser beam on a pit formed on an optical disk D and guides its reflected light to the photodetector 112 in the opposite direction. The optical head 115 is driven in tracking and focusing directions X and Y by a drive means (not shown).

According to the system shown in FIG. 1, a slight inclination of an optical path (a variation in angle of the laser beam incident upon the object lens 116, which is caused when the optical head 115 is driven in the tracking direction X, can be corrected by controlling a rocking angle of the fixed galvanomirror 114. It is thus unnecessary to mount any means for inclining the object lens 116 itself on the optical head 115, with the result that the optical head 115 can be reduced in weight and a quick seek can be achieved.

The galvanomirror 114 used in the above-described system has the structure as shown in FIGS. 2 to 4. Of these figures, FIG. 2 is a plan view of the galvanomirror 114, and FIGS. 3 and 4 are cross-sectional views taken along lines III—III and IV—IV of FIG. 2, respectively.

Referring to FIG. 2, the galvanomirror 114 includes a reflector 117 for reflecting a laser beam, a rocking member 118 to which the reflector 117 is fixed, and two supporting members 120a and 120b for supporting the rocking member 118 against a fixing section 119. The fixing section 119 has a yoke 121 and a magnet 122 as shown in FIGS. 3 and 4, and the reflector 117 can be rocked with respect to the axes of the supporting members 120a and 120b by causing an electric field to affect coils 123 fixed onto the sides of the rocking member 118.

However, there is danger that the surface of the reflector 117 will incline gradually due to variations in temperature and with age. Since this inclination makes it difficult to accurately guide a laser beam reflected by the galvanomirror 114 to the object lens 116, a tracking offset occurs and thus a correct tracking operation is likely to be prevented. Since, moreover, the inclination varies with a distance from the galvanomirror 114 to the object lens 116, a complicated control of further correcting the rocking angle of the galvanomirror 114 in accordance with the current position of the optical head 115 is required.

It is thus desirable to provide a fixed optical system wherein a galvanomirror is loaded onto an optical head to maintain a fixed distance between the galvanomirror and object lens.

As described above, however, the galvanomirror 114 includes yoke 121, magnet 122, coils 123, and the like, and thus the optical head 115 is increased in weight. If the galvanomirror 114 is loaded onto the optical head 115, a high-speed seek of the head 115 cannot be achieved. Consequently, the high-speed seek cannot be achieved by the optical head loaded with the galvanomirror.

SUMMARY OF THE INVENTION

It is accordingly an object of the present invention to provide a galvanomirror with a light, compact optical head and an optical disk drive capable of high-speed seek.

According to a first aspect of the present invention, there is provided a galvanomirror comprising:

a chargeable rocking member with a reflector;

a supporting member for supporting the rocking member to allow the rocking member to be rocked; and a chargeable electrode for moving the rocking member by electrostatic force such that the reflector reflects light at a desired angle.

In the galvanomirror so constituted, it is desirable that the reflector is formed by mirror-finishing the rocking member, the rocking member is formed of semiconductor material, the semiconductor material includes silicon, and the rocking member includes material having an anisotropic crystal structure.

It is also desirable that the rocking member and supporting member are formed integrally as one component by the same material, the material is semiconductor material, and the semiconductor material includes silicon.

Further, it is desirable that the supporting member rotatably supports the rocking member and the supporting member is constituted of an elastic member.

Moreover, it is desirable that the galvanomirror further comprises a sensor for sensing capacitance between the rocking member and the electrode and a circuit for correcting an amount of rocking of the rocking member based on the capacitance sensed by the sensor.

According to a second aspect of the present invention, there is provided a galvanomirror comprising:

a first plate having a hollow portion;

a chargeable rocking member located in the hollow portion of the first plate and having a reflector;

a supporting member fixed onto the first plate, for supporting the rocking member to allow the rocking member to be rocked;

second and third plates opposed to each other, the first plate being interposed therebetween; and chargeable electrodes provided on the second and third plates at positions corresponding to the rocking member, for moving the rocking member by electrostatic force such that the reflector reflects light at a desired angle.

It is desirable that the galvanomirror is sealed with the first to third plates.

It is also desirable that the rocking member, the supporting member and the first plate are formed integrally as one component by the same material, the material is semiconductor material, and the semiconductor material includes silicon.

According to a third aspect of the present invention, there is provided an optical disk drive comprising an optical head loaded with a light source for emitting a laser beam, a galvanomirror for reflecting the laser beam emitted from the light source, and an objective lens for focusing the laser beam reflected by the galvanomirror upon an optical disk, wherein the galvanomirror comprises:
 a chargeable rocking member with a reflector;
 a supporting member for supporting the rocking member to allow the rocking member to be rocked; and
 a chargeable electrode for moving the rocking member by electrostatic force such that the reflector reflects the laser beam at a desired angle.

According to a fourth aspect of the present invention, there is provided an optical disk drive comprising an optical head loaded with a light source for emitting a laser beam, a galvanomirror for reflecting the laser beam emitted from the light source, and an objective lens for focusing the laser beam reflected by the galvanomirror upon an optical disk, wherein the galvanomirror comprises:
 a first plate having a hollow portion;
 a chargeable rocking member located in the hollow portion of the first plate and having a reflector;
 a supporting member fixed onto the first plate, for supporting the rocking member to allow the rocking member to be rocked;
 second and third plates opposed to each other, the first plate being interposed therebetween; and
 chargeable electrodes provided on the second and third plates at positions corresponding to the rocking member, for moving the rocking member by electrostatic force such that the reflector reflects the laser beam at a desired angle.

As described above, since the galvanomirror of the present invention does not include an element of large mass such as a yoke, a magnet and a coil, the optical head can be made light and compact. An optical disk drive having such a light, compact optical head improves the seek operation.

The optical head is driven by electromagnetic force, whereas the galvanomirror is done by electrostatic force; therefore, no crosstalk (interaction) occurs between them. For this reason, the objective lens and galvanomirror can be arranged proximal to each other, which reduces the size of the optical head further. In the optical disk drive using the galvanomirror causing no crosstalk, the precision of seek and the reliability of recording/reproduction can be improved further.

Since the galvanomirror of the present invention is so constructed as to generate driving force using electrostatic force, power consumption can be decreased. Furthermore, in the optical disk drive using the galvanomirror of the present invention, a thermally adverse effect upon the optical unit (including a semiconductor laser, etc.) and the objective lens loaded on the optical head can be avoided as much as possible.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 20 is a plan view of a first plate constituting a galvanomirror according to a fifth embodiment of the present invention; and FIG. 21 is a view of an optical head loaded with the galvanomirror shown in FIG. 20.

DETAILED DESCRIPTION OF THE PREFERRED EMBODIMENTS

Embodiments of the present invention will now be described with reference to the accompanying drawings.

(First Embodiment)

Figure 1:
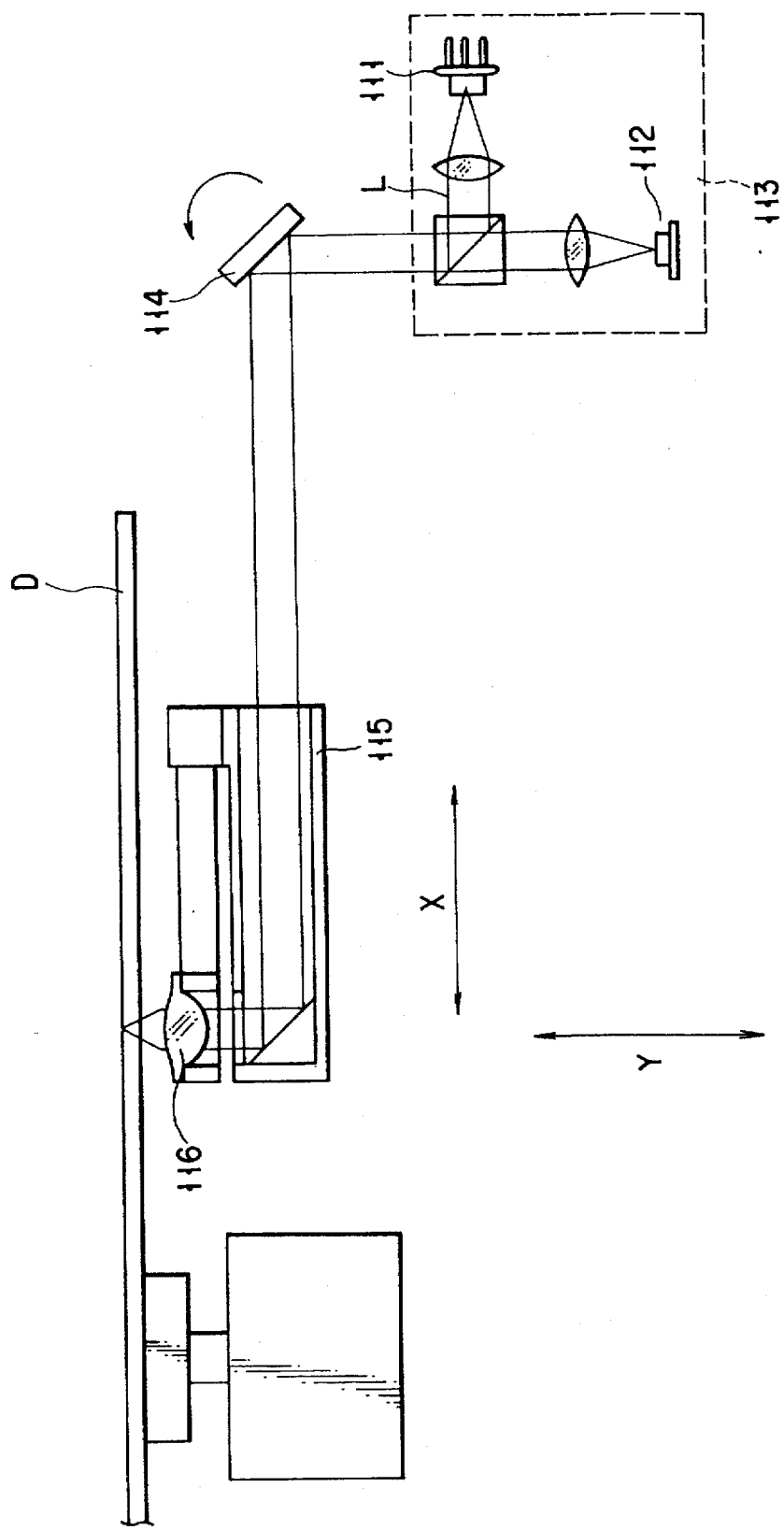
FIG. 1 is a cross-sectional view of the constitution of a prior art optical disk drive (of a separated optical system)
Figure 2:
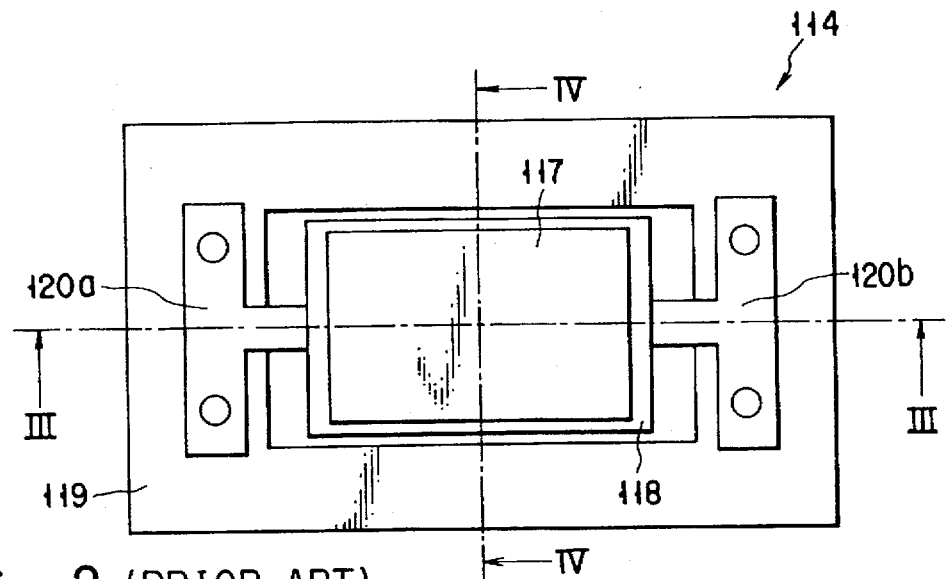
FIG. 2 is a plan view of the structure of a galvanomirror of the prior art optical disk drive shown in FIG. 1.
Figure 3:
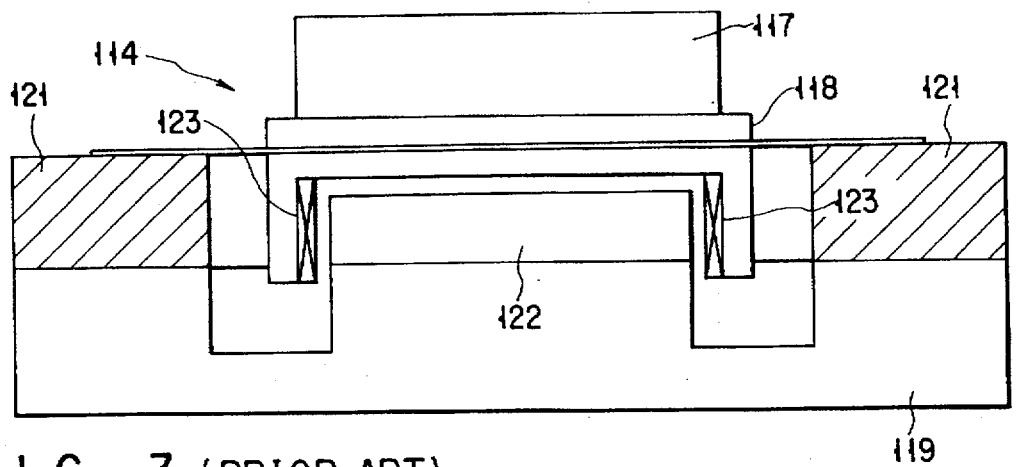
FIG. 3 is a cross-sectional view taken along line III—III of FIG. 2.
Figure 4:
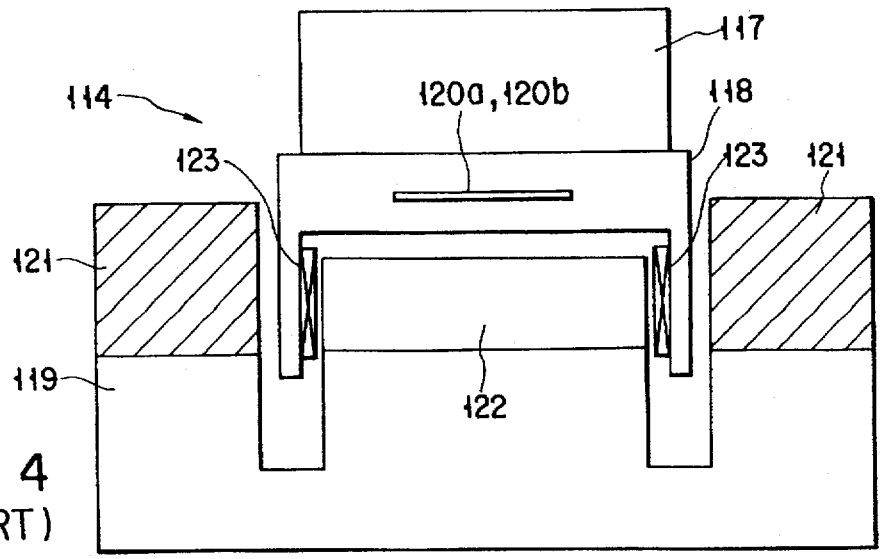
FIG. 4 is a cross-sectional view taken along line IV—IV of FIG. 2.
Figure 5:
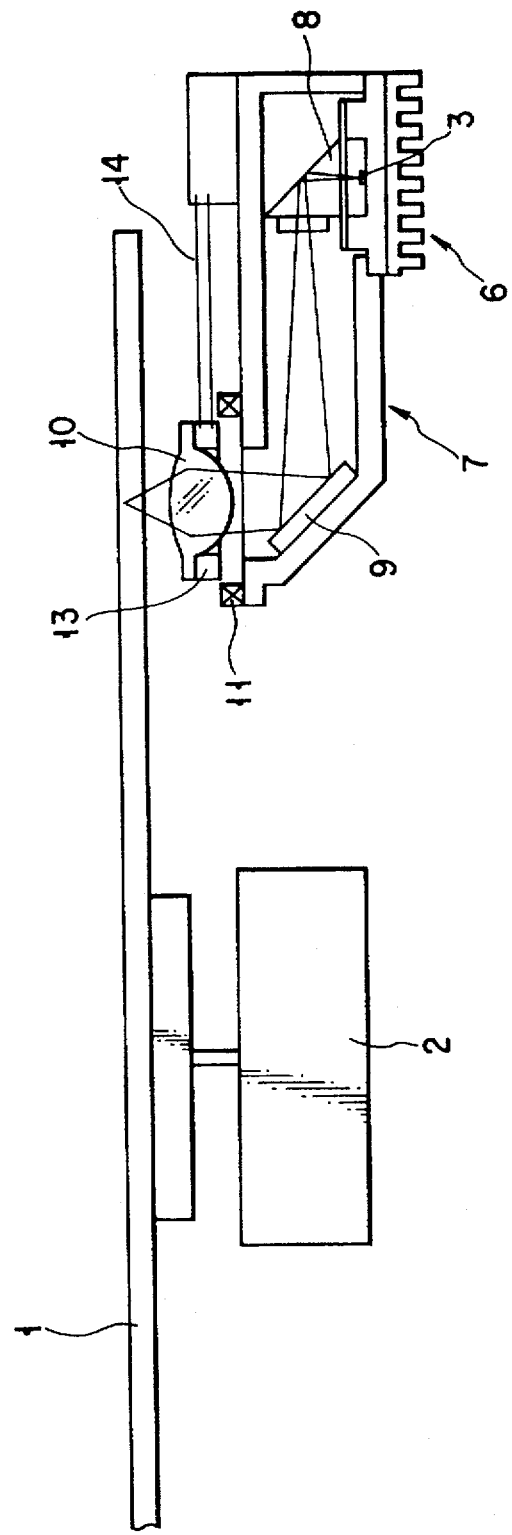
FIG. 5 is a view of the constitution of an optical disk drive loaded with a galvanomirror according to a first embodiment of the present invention.
Figure 6:
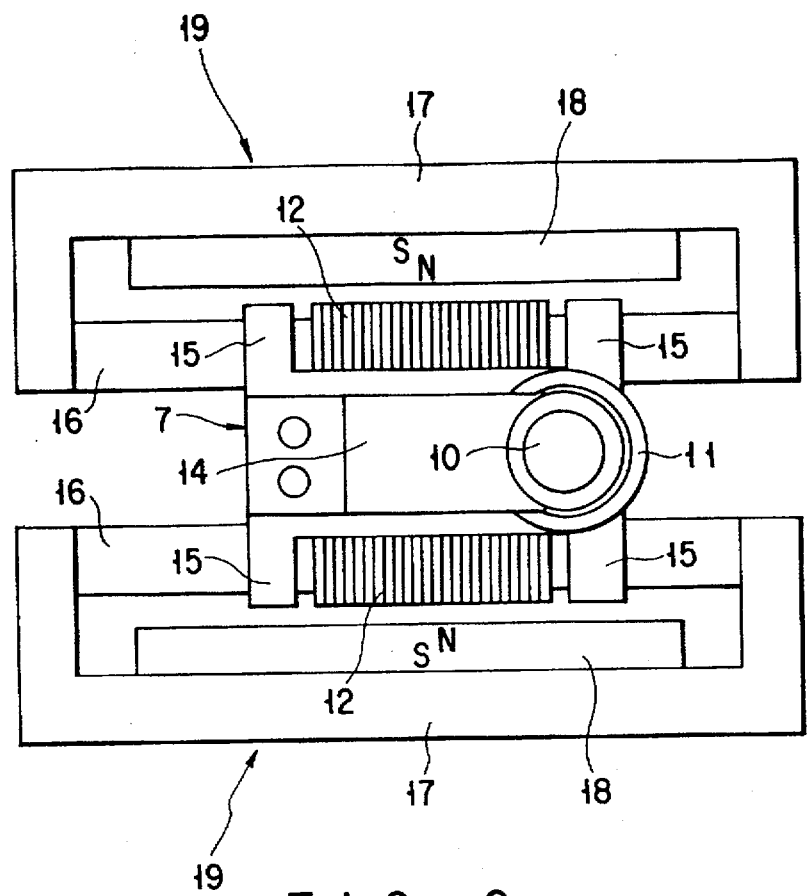
FIG. 6 is a plan view of the structure of a drive system including an optical head of the optical disk drive shown in FIG. 5.
Figure 7:
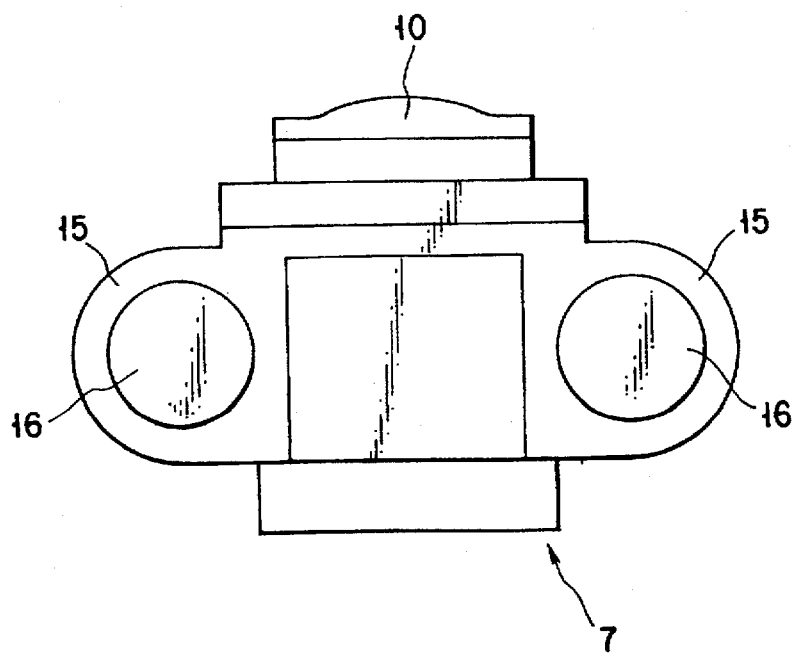
FIG. 7 is a cross-sectional view of the structure of the optical head shown in FIG. 6.
Figure 8:
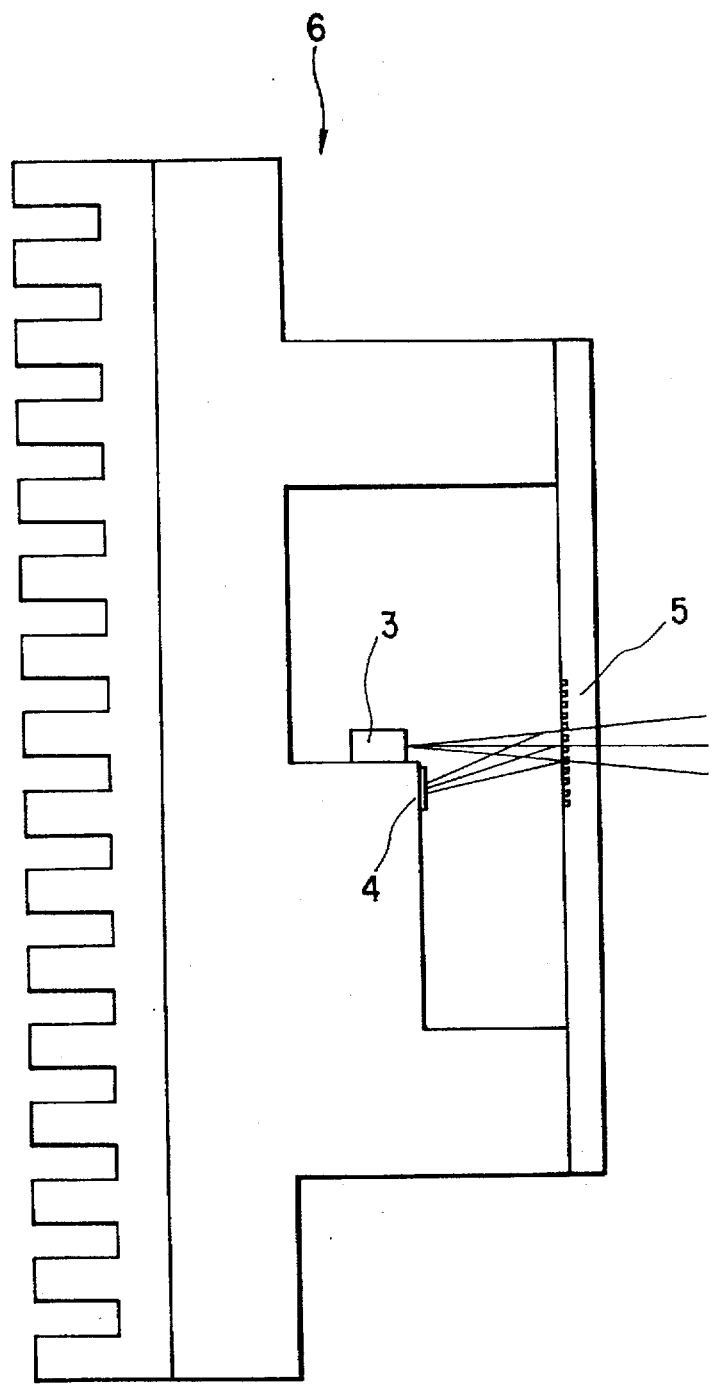
FIG. 8 is a cross-sectional view of the structure of an optical unit of the drive system shown in FIG. 5.

First, an optical disk drive loaded with a galvanomirror according to the present invention will be described with reference to FIGS. 5 to 8. FIG. 5 is a cross-sectional view showing the internal structure of the optical disk drive, FIG. 6 is a plan view of a drive system including an optical head, FIG. 7 is a cross-sectional view of the optical head, and FIG. 8 is a cross-sectional view of an optical unit. The drive system is omitted from FIG. 5.

A disk 1 (e.g., optical disk, magnetooptic disk) for recording/reproducing information is held by a spindle motor 2 fixed to a base (not shown) by a chucking means such as a magnet chuck. The spindle motor 2 stably rotates the disk 1 during the recording or reproduction.

A semiconductor laser 3 for emitting a laser beam to the disk 1 constitutes an optical unit 6, together with a photodetector 4, an HOE (Hologramic Optical Element) 5, as shown in FIG. 8, and the like. The optical unit 6 is fixed to the lower portion of the optical head 7. The undersurface of the optical unit 6 has irregularities for the purpose of improving heat radiation.

The laser beam emitted from the laser 3 is transmitted through the HOE 5 formed on a glass plane and then guided to an object lens 10 disposed on the upper portion of the optical head 7 while changing its direction 90 degrees by a prism 8 fixed onto the opposite plane of the HOE 5 and changing it 90 degrees again by a galvanomirror 9. By virtue of the object lens 10, the laser beam is focused on a recording track of the disk 1.

The light reflected by the disk 1 is returned to the object lens 10 and then guided again to the HOE 5 through the galvanomirror 9 and prism 8. The light changes its direction here and returns to the photodetector 4. A recording information signal, a focus offset signal, a track offset signal and the like are generated from the light returned to the photodetector 4. In response to the focus offset signal, a shift in position of the object lens 10 in the focus direction is detected, and a control operation of causing a current to flow through a focus coil 11, which is wounded around the optical head 7, is performed to correct the shift. In response to the track offset signal, a shift in position of the lens 10 in the track direction is detected, and a control operation of applying a voltage to the galvanomirror 9 and linear motor coils 12 to correct the shift. Thus information is recorded/reproduced to/from the recording track of the disk 1.

The object lens 10 is held by an object lens holder 13 formed by a plastic magnet. One end of a parallel plate spring 14 is fixed to the holder 13 and the other end is fixed to the optical head 7, with the result that the object lens 10 is movably supported in its optical axis direction. The electromagnetic action occurs between the holder 13 and the current flowing through the focus coil 11 and causes the lens 10 to have driving force in the focus direction.

As illustrated in FIG. 6, two linear motor coils 12 are cylindrically formed and fixed onto both sides of the optical head 7, and two slide bearings 15 are formed so as to interpose each of the linear motor coils 12 and engaged with each of two guide shafts 16 extending in the radial direction of the disk 1. The optical head 7 can thus be moved in the radial direction of the disk 1.

The guide shafts 16 are constituted by magnetic materials to serve as a yoke of a magnetic circuit. A "]"-shaped back yoke 17 is fixed to both ends of each of the guide shafts 16. A radial magnet 18, which is arranged opposite to each of the linear motor coils 12 with a magnetic gap therebetween, is fixed to the corresponding back yoke 17. The guide shaft, back yoke 17 and radial magnet 18 constitute a radial magnetic circuit 19 to cause a magnetic field to act on the linear motor coil 12. Thus the optical head 7 is driven in the radial direction of the disk 1 by the electromagnetic action between the magnetic field and current flowing through the linear motor coil 12.

Figure 9:
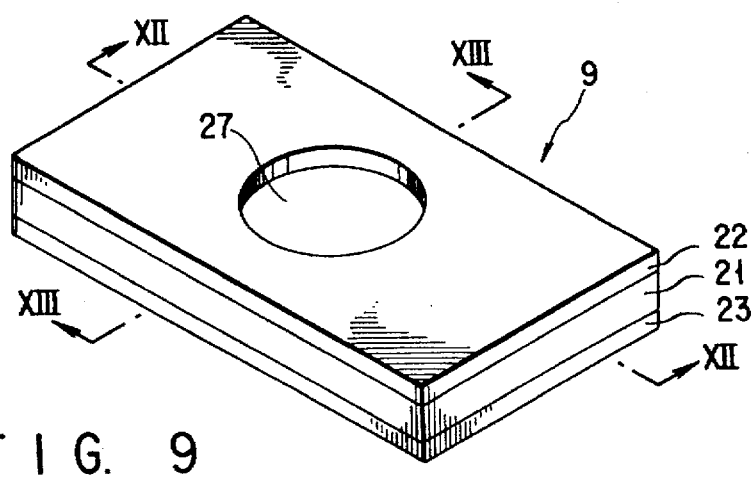
FIG. 9 is a perspective view of the structure of the galvanomirror shown in FIG. 5.
Figure 10:
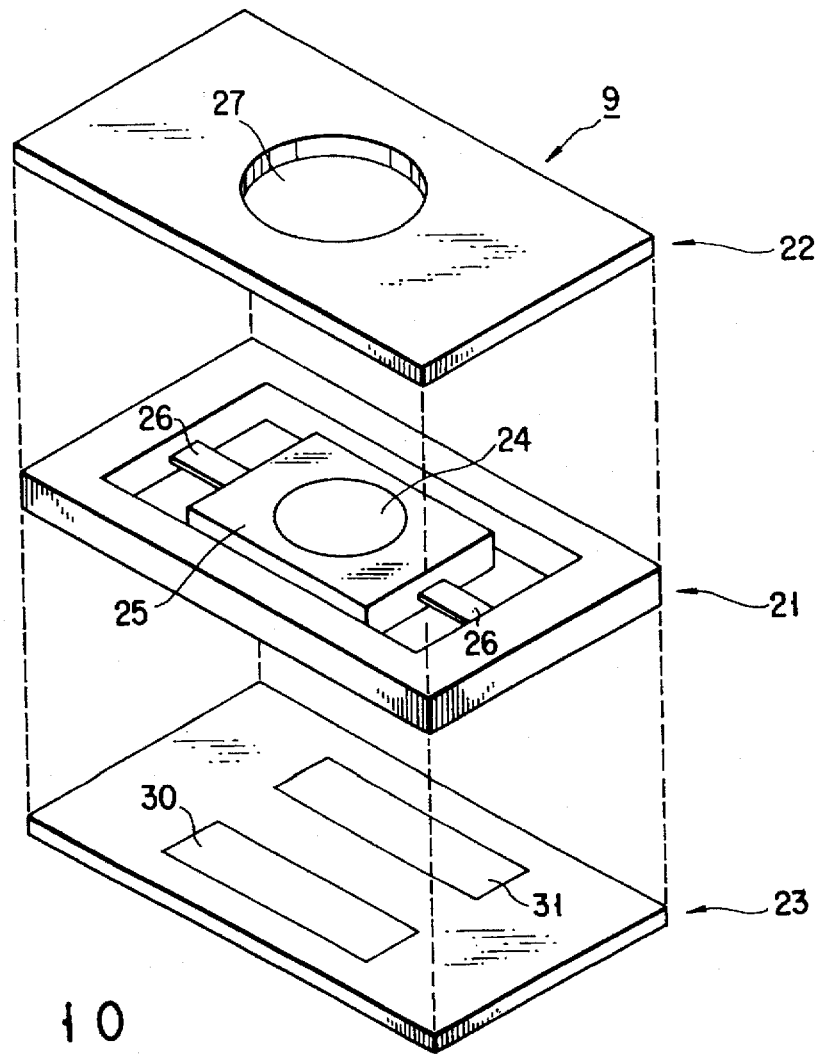
FIG. 10 is an exploded perspective view of the structure of the galvanomirror shown in FIG. 9.
Figure 11A:
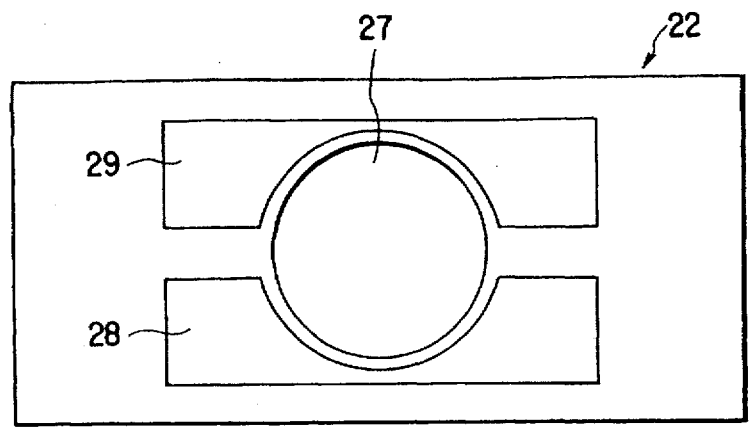
FIGS. 11A and 11B are plan views illustrating electrodes arranged on second and third plates shown in FIG. 10.
Figure 11B:
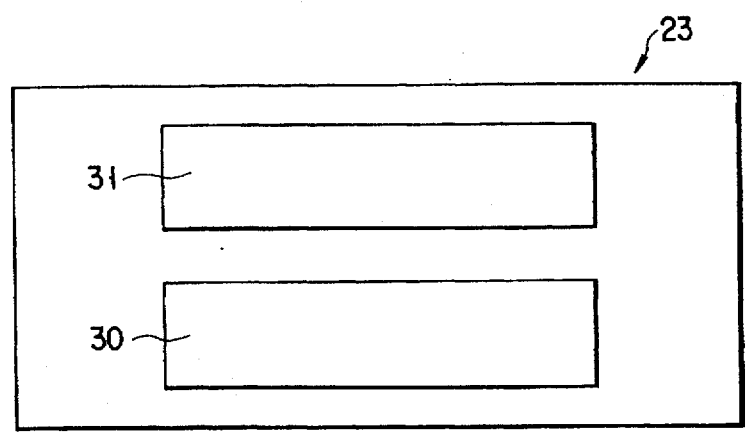
Figure 12:
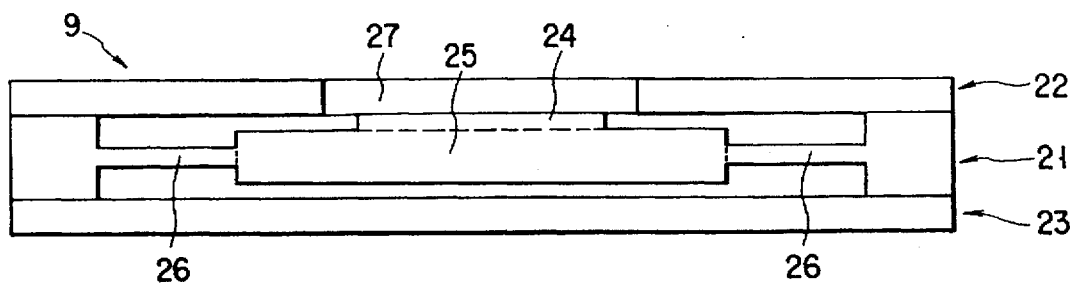
FIG. 12 is a cross-sectional view taken along line XII—XII of FIG. 9.
Figure 13:
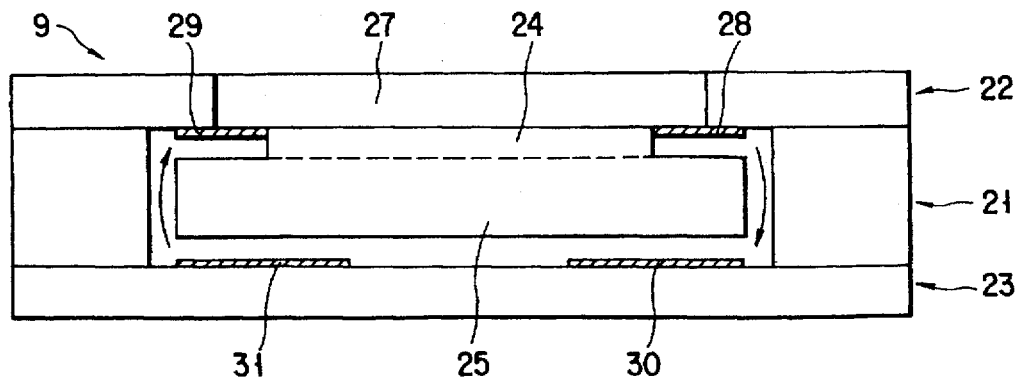
FIG. 13 is a cross-sectional view taken along line XIII—XIII of FIG. 9.

The structure of the galvanomirror 9 will now be described specifically with reference to FIGS. 9 to 13. FIG. 9 is a perspective view of the galvanomirror, FIG. 10 is an exploded perspective view thereof, FIGS. 11A and 11B are plan views of second and third plates, and FIGS. 12 and 13 are cross-sectional views taken along lines XII—XII and XIII—XIII of FIG. 9, respectively.

As shown in FIG. 9, the galvanomirror 9 has a layered structure of first, second and third plates 21, 22 and 23. These plates are illustrated in FIG. 10. The first plate 21 has a frame-like hollow structure. In this hollow, a reflector 24 for reflecting a laser beam emitted from the semiconductor laser 3, a rocking member 25 having the reflector 24 in its center, and two elastic members (supporting members) 26 for connecting the rocking member 25 to the first plate 21 are arranged. The center of gravity of a movable section constituted of both reflector 24 and rocking member 25 is set in the vicinity of the halfway point between the two elastic members 26.

The reflector 24, rocking member 25 and elastic member 26 are integrally formed as one component by anisotropic etching of a semiconductor containing silicon as the main ingredient, and the reflector 24 is formed right on the rocking member 25 by mirror-finishing the semiconductor.

The reflector 24 is projected 2 to 3μm from the rocking member 25. The elastic members 26 are formed of materials capable of electrically insulating the first member 21 and rocking member 25 from each other.

The second and third plates 22 and 23 are bonded to both sides of the first plate 21 by a diffusion bonding means or the like. These plates 22 and 23 are formed of glass type members and electrically insulated from the first plate.

Since the materials of the first plate 21 and rocking member 25 have substantially the same thermal expansion coefficient as that of the materials of the second and third plates 22 and 23, the rocking member 25 can be prevented as greatly as possible from being thermally distorted because of variations in temperature. In other words, the glass type members of the second and third plates 22 and 23 have substantially the same thermal expansion coefficient as that of the material of the first plate 21.

The second plate 22 has an opening 27 in its center so as not to optically restrict the reflector 24 of the first plate 21.

The second and third plates 22 and 23 are each provided with two electrodes at portions corresponding to the rocking member 25 of the first plate 21. FIG. 11A is a plan view of the second plate 22 seen from the first plate 21, and electrodes 28 and 29 are arranged on both sides of the second plate 22. FIG. 11B is a plan view of the third plate 23 seen from the first plate 21, and electrodes 30 and 31 are arranged on both sides of the third plate 23.

The electrodes 28 to 31 are formed by evaporation or sputtering with respect to the second and third plates 22 and 23. These electrodes can be constituted by transparent electrodes.

A method of driving the galvanomirror having the above constitution will be described.

If the rocking member 25 formed of the semiconductor is charged positively, the electrodes 29 and 30 are charged negatively and the electrodes 28 and 31 are charged positively, then the two elastic members 26 (shown in FIG. 12) are twistedly deformed, and the rocking member 25 is rotated in the direction of arrows indicated in FIG. 13. To rotate the rocking member 25 in the opposite direction, the electrodes 29 and 30 have only to be charged positively and the electrodes 28 and 31 have only to be charged negatively. Thus, the rocking member 25 is rotated by electrostatic force, and the inclination of the reflector 24 is changed.

To correctly calculate the rotation (rocking) angle of the rocking member 25, the capacitance between the rocking member 25 and each of the electrodes 28 to 31 is measured (detected), and a gap length between the rocking member 25 and each of the second and third plates 22 and 23 is obtained based on the measured capacitance. By electrically correcting a tracking offset based on the calculated rotation angle, the restrictions of the rotation angle peculiar to the galvanomirror can be almost eliminated, thereby allowing stable, precise tracking control.

The tracking offset is corrected externally by connecting a lead wire, a flexible semiconductor substrate, or the like to the electrodes 28 to 31 and causing it to communicate with the outside of the optical head.

If variations in the gap length is obtained from variations in the capacitance, the inclination of the reflector 24 due to an increase in temperature and a variation with age can be corrected. In this case, it is desirable to always observe the variations in the gap length by calculating the acceleration of rocking of the rocking member 25 using an accelerometer and execute feedback control so as to compensate for nonlinearity of the operation of the rocking member 25.

According to the first embodiment described above, since the galvanomirror 9 does not include an element of large mass such as a yoke, a magnet, and a coil, it is lightened more greatly than the conventional one. Therefore, the optical head 7 loaded with the galvanomirror 9 can be kept light and compact and thus enables a high-speed seek.

Since, furthermore, the reflector 24 is formed directly on the rocking member 25 without using any adhesive, the rotating force of the member 25 directly acts on the reflector 24. Thus the resonance frequency of a resonance mode whose phase exceeds 180° can be increased thereby enabling high-precision tracking control. The optical head 7 can be sufficiently applied to an optical disk with a narrow track pitch, resulting in improvement in recording density.

Since, moreover, the rocking member 25 is so constituted as to produce driving force by electrostatic force, the power consumption can be decreased, and an adverse influence of heat on the optical unit 6 (including semiconductor laser 3, etc.) or the object lens 10 loaded onto the optical head 7, can be avoided as much as possible.

The center of gravity of the rocking member 25 is set on the rotation axis of the member 25, i.e., on the line connecting the two elastic members 26, and the rotation (rocking) of the member 25 is achieved by distortion of the members 26. Therefore, the rotation is not adversely affected by any disturbance acceleration.

(Second Embodiment)

Figure 14:
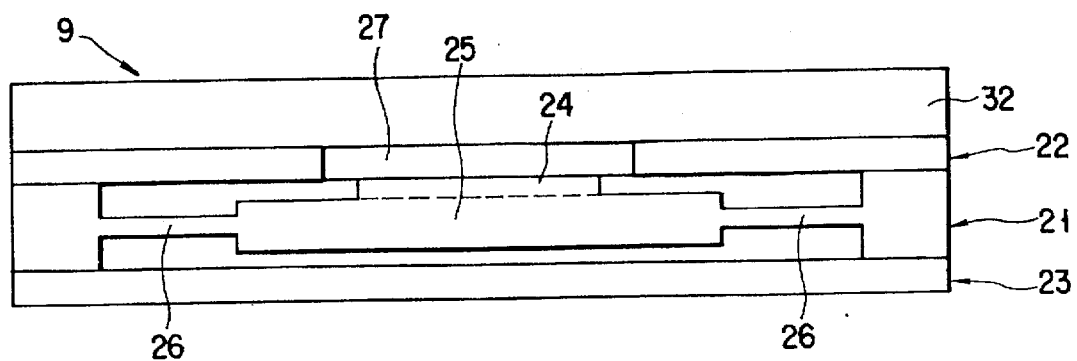
FIG. 14 is a cross-sectional view of the structure of a galvanomirror according to a second embodiment of the present invention.

A second embodiment of the present invention will now be described with reference to FIG. 14. In FIG. 14, the same structural elements as those of the first embodiment are denoted by the same reference numerals and their descriptions are omitted. (The same is true of the third to fifth embodiments described later.)

The second embodiment differs from the first embodiment in that, as shown in FIG. 14, a light transmitting cover glass 32 is fixed onto the surface of a second plate 22 and, in other words, a rocking member 25 and electrodes 28 to 31 are completely sealed with the cover glass 32 and first to third plates 21 to 23. This structure manifests the effect that no dust invades a space between the rocking member 25 and electrodes 28 to 31, vapor is not likely to condense, or a short circuit due to the condensation did not likely to cause damage to a driving circuit or the like.

Figure 15:
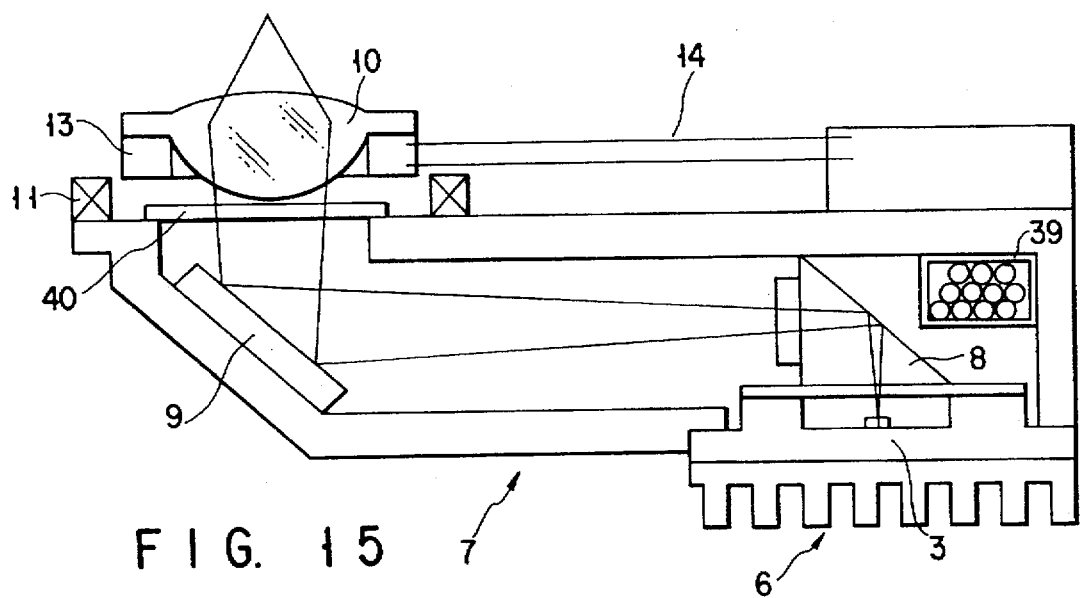
FIG. 15 is a cross-sectional view of the structure of an optical head of a modification to the galvanomirror shown in FIG. 14.

Instead of the cover glass 32, a cover glass 40 can be fixed to the optical head 7 under the object lens 10 to completely seal the inside the optical head 7, as illustrated in FIG. 15. In other words, an optical path through which a laser beam emitted from a semiconductor laser 3 of an optical unit 6 is reflected by a galvanomirror 9 and guided to the cover glass 40, becomes a completely closed space by the optical unit 6 and cover glass 40, thus preventing dust from invading the closed space. As in the case of using the cover glass 32, vapor is unlikely to condense. A container 39 containing a dehumidifying agent such as silica gel can be provided in the closed space. The use of the optical head 7 having such a constitution greatly improves the reliability of the optical system of an optical disk drive.

(Third Embodiment)

Figure 16:
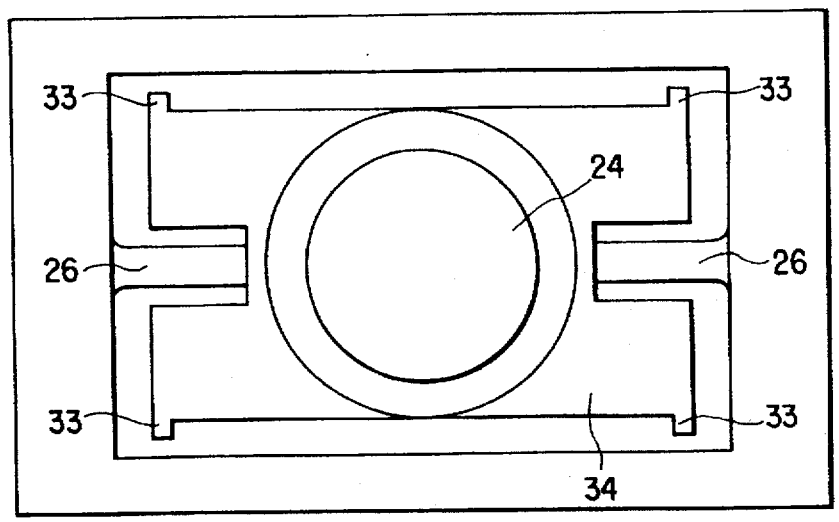
FIG. 16 is a plan view of a first plate constituting a galvanomirror according to a third embodiment of the present invention.
Figure 17A:
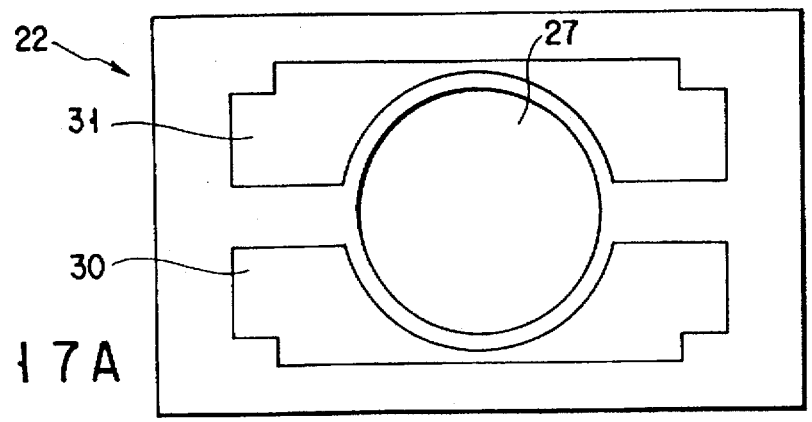
FIGS. 17A and 17B are plan views of second and third plates constituting the galvanomirror according to the third embodiment.
Figure 17B:
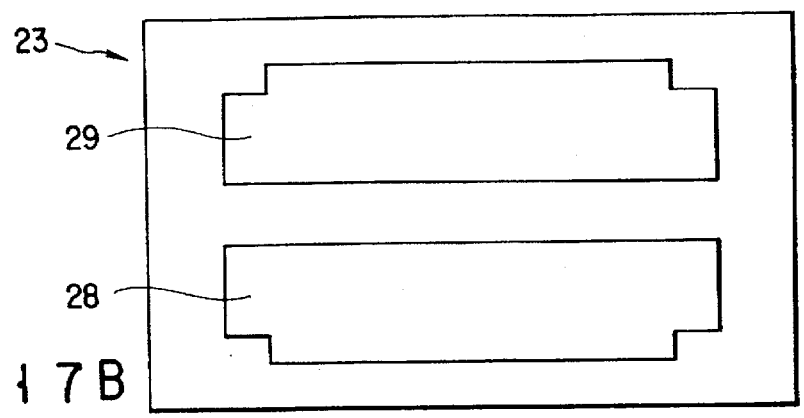

A third embodiment of the present invention will now be described with reference to FIGS. 16, 17A and 17B.

The third embodiment differs from the first embodiment in the shape of a rocking member. While the rocking member 25 of the first embodiment is quadrangular, rocking member 34 of the third embodiment is shaped like a quadrangle whose corners are provided with projections 33. As illustrated in FIGS. 17A and 17B, only those portions of electrodes 28 to 31 formed on second and third plates 22 and 23 which contact the projections 33, are cut away.

According to the third embodiment having the above constitution, when the rocking member 34 receives such great rotating (rocking) force as to exceed its limitation, the projections 33 are placed into contact with the second and third plates 22 and 23. It is thus possible to restrict a range of the rotation (rocking) angle.

Since there occurs point contact between the projections 33 and the plates 22 and 23, it is unlikely that the rocking member 34 will adsorb on the plates.

Since, furthermore, the contact points between the projections and plates correspond to the cutaway portions of the electrodes 28 to 31, a driving circuit can be prevented from being damaged due to short circuits of the electrodes.

The rocking member 34 is so constituted that its portions connected to elastic members 26 are extended inwardly and thus shaped concavely. With this constitution, the elastic members 26 can be lengthened; therefore, they can be relatively easily twistedly deformed without being forcibly distorted.

(Fourth Embodiment)

Figure 18:
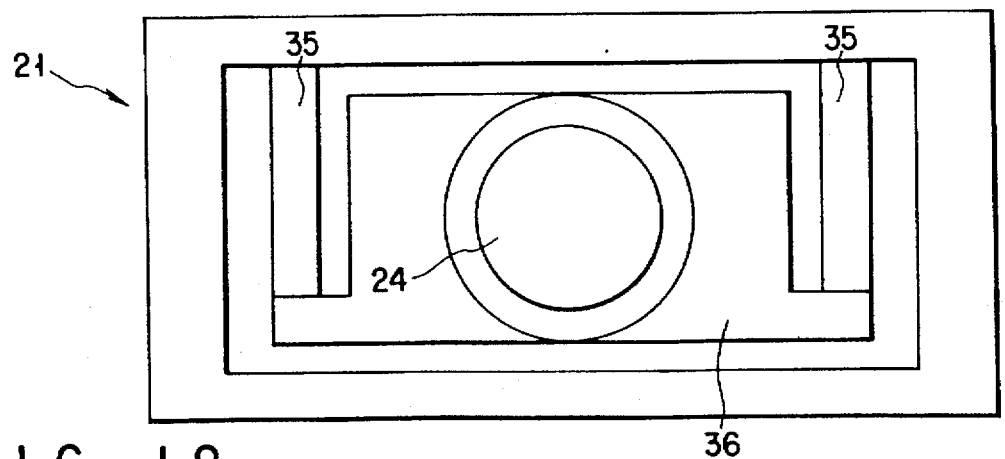
FIG. 18 is a plan view of a first plate constituting a galvanomirror according to a fourth embodiment of the present invention.

A fourth embodiment of the present invention will now be described with reference to FIGS. 18 and 19.

It is in the shape of a rocking member that the fourth embodiment differs from the first embodiment. According to the first embodiment, the center of gravity of the rocking member 25 is located on the line connecting the two elastic members 26, and the member 25 is rotated (rocked) by the twist deformation of the members 26. In the fourth embodiment, as shown in FIG. 18, two elastic members 35 extend in parallel from one end of first plate 21, and a rocking member 36 is rotated (rocked) by bend deformation of the elastic members 35.

The constitution of the fourth embodiment enables the sectional area of the elastic members 35 to be enlarged; thus a galvanomirror 9 is hard to destroy due to some shocks.

Figure 19:
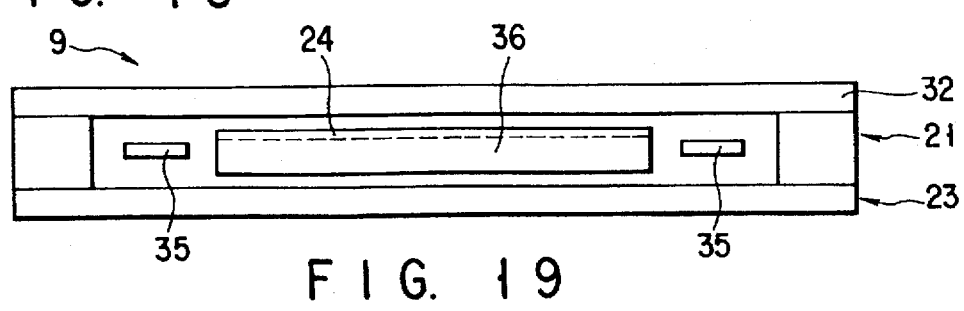
FIG. 19 is a cross-sectional view depicting the structure of a galvanomirror according to a fourth embodiment of the present invention.

In the fourth embodiment, as shown in FIG. 19, a cover glass 32 is employed in place of the second plate. The cover glass 32 is constituted by coated glass type materials which transmit a laser beam sufficiently. In adopting this constitution, too, a galvanomirror 9 can be sealed perfectly.

(Fifth Embodiment)

A fifth embodiment of the present invention will be described with reference to FIGS. 20 and 21.

The fifth embodiment differs from the first embodiment in that a plurality of laser beams are emitted (see FIG. 21) and a plurality of rocking members 25 are provided accordingly (see FIG. 20). An optical unit 6 includes three semiconductor lasers 3 and three photodetectors.

Three laser beams emitted from the respective semiconductor lasers 3 are focused on a focusing lens 37. A galvanomirror 38, which includes three rocking members, shown in FIG. 20, and reflectors 24, is fixedly disposed in the vicinity of the focusing lens. The reflectors 24 reflect different laser beams. The reflected laser beams are collected and focused separately on a recording track of a disk 1 by means of an objective lens 10. The fine adjustment for positioning the respective focusing spots is performed by controlling the rotation (rocking) angle of the rocking members 25.

Though FIG. 20 shows no electrodes, each of the rocking members 25 has four electrodes as in the first to fourth embodiments described above.

In such an optical disk drive required for processing plural laser beams, too, they can be subjected to tracking control independently.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

In particular, the present invention is not limited to the galvanomirror applied to an optical disk drive, but it is needless to say that the galvanomirror can be employed as an optical system of various types of apparatuses.

The rocking members can be produced by materials other than silicon if the materials can be charged by electrostatic force. For example, a molding method can be adopted to produce the rocking members.

In the above-described embodiments, the reflectors, rocking members and elastic members are formed integrally as one component by anisotropic etching. However, they can be formed by dry etching or the like.

Moreover, in the above embodiments, four electrodes are used to control one rocking member. The present invention is not limited to this, but only one or two of them can be used to do so.

Furthermore, in the above embodiments, the galvanomirror is sealed with three different (first to third) plates. The galvanomirror can be sealed with one or two plates if it can be done completely. The plates can be replaced by a member having a shape capable of sealing the galvanomirror. If an optical head loaded with the galvanomirror is sealed, the galvanomirror need not be done.

As described in detail above, since the galvanomirror of the present invention does not include an element of large mass such as a yoke, a magnet and a coil, the optical head can be made light and compact. An optical disk drive having such a light, compact optical head improves the seek operation.

The optical head is driven by electromagnetic force, whereas the galvanomirror is done by electrostatic force; therefore, no crosstalk (interaction) occurs between them. For this reason, the objective lens and galvanomirror can be arranged proximal to each other, which reduces the size of the optical head further. In the optical disk drive using the galvanomirror causing no crosstalk, the precision of seek and the reliability of recording/reproduction can be improved further.

Since the galvanomirror of the present invention is so constructed as to generate driving force using electrostatic force, power consumption can be decreased. Furthermore, in the optical disk drive using the galvanomirror of the present invention, a thermally adverse effect upon the optical unit (including a semiconductor laser, etc.) and the objective lens loaded on the optical head can be avoided as much as possible.

What is claimed is:

1. An optical disk drive comprising:
    an objective lens for focusing a laser beam on an optical disk
    an optical head supporting said objective lens and movable along a surface of the optical disk;
    a galvanomirror, connected to said optical head, driven by electrostatic force, and disposed to reflect the laser beam;
    a magnet, operatively coupled to said objective lens and producing a magnetic field; and
    a coil, disposed to interact with the magnetic field of said magnet, and producing electromagnetic force to move said objective lens.

2. The drive according to claim 1, wherein said galvanomirror comprises:
    a chargeable rocking member with a reflector;
    a supporting member for supporting said rocking member to allow said rocking member to be rocked; and
    a chargeable electrode for moving said rocking member by electrostatic force such that said reflector reflects light at a desired angle.

3. The drive according to claim 2, wherein:
    said reflector of said rocking member is formed by mirror-finishing said rocking member.

4. The drive according to claim 3, wherein:
    said rocking member is formed of semiconductor material.

5. The drive according to claim 4, wherein:
    said semiconductor material includes silicon.

6. The drive according to claim 3, wherein:
    said rocking member includes material having an anisotropic crystal structure.

7. The drive according to claim 2 wherein:
    said rocking member and said supporting member are formed integrally as one component by same material.

8. The drive according to claim 7, wherein:
    said rocking member and said supporting member are formed of semiconductor material.

9. The drive according to claim 8, wherein:
    said semiconductor material includes silicon.

10. The drive according to claim 7, wherein:
    said supporting member rotatably supports said rocking member.

11. The drive according to claim 10, wherein:

said supporting member is constituted of an elastic member.

12. The drive according to claim 2, wherein said galvanomirror further comprises:

a sensor for sensing capacitance between said rocking member and said electrode.

13. The drive according to claim 12, wherein said galvanomirror further comprises:

a circuit for correcting an amount of rocking of said rocking member based on the capacitance sensed by said sensor.

14. The optical disk drive of claim 2, wherein:

said supporting member allows said rocking member to be rocked by said supporting member twisting.

15. The optical disk drive of claim 2, wherein:

said supporting member allows said rocking member to be rocked by said supporting member bending.

16. The optical disk drive of claim 1, wherein:

said galvanomirror is operable for rocking about an axis of rotation located near a symmetrical center line of said galvanomirror.

17. The optical disk drive of claim 1, wherein:

said galvanomirror is operable to rock in at least two directions.

* * * * *